April 19, 1949. J. C. KING 2,467,433
WATER TREATING PLANT
Filed May 29, 1946 2 Sheets-Sheet 1

John C. King
INVENTOR,
BY Loyal J. Miller
ATTORNEY

April 19, 1949.   J. C. KING   2,467,433
WATER TREATING PLANT

Filed May 29, 1946   2 Sheets-Sheet 2

John C. King
INVENTOR,

BY Loya J. Miller
ATTORNEY

Patented Apr. 19, 1949

2,467,433

UNITED STATES PATENT OFFICE 2,467,433

WATER TREATING PLANT

John C. King, Oklahoma City, Okla.

Application May 29, 1946, Serial No. 673,187

1 Claim. (Cl. 210—24)

The invention relates to apparatus for chemically treating water, particularly water for use in boilers.

It is common practice at the present time to provide a treating tank for retaining a bed of chemicals, the boiler water being forced to percolate through the bed before being introduced to the boiler. The flakes or granules of the chemical bed, after considerable use, became coated and more or less clogged by mineral deposit from the water. When this condition arises, it is necessary to flush the bed with a saline solution in order to remove the mineral deposit, usually alkaline in nature, which forms a coating around the granules.

The present invention primarily relates to apparatus whereby the above mentioned chemical bed may be periodically cleaned and freshened.

In freshening the chemical bed in such water treating plants, it is common practice to add a salt or salts to the flushing water, and to forcibly agitate the chemical bed by reversing the direction of flow therethrough of the flushing saline solution. It has become a common practice in such treating plants to provide an auxiliary tank adjacent the treating tank, with pipe connections leading between the two. The plumbing arrangement is such that after the auxiliary tank has been filled with salt, water may be introduced therein to mix with the salt, and the mixture may then be forcibly introduced into the treating tank to agitate the chemical bed, so as to freshen and cleanse the same. After the flushing operation, the auxiliary or salt tank is then disconnected through valve operation from operative communication with the treating tank.

The above described conventional mode of construction and operation is such, that the salt tank remains idle between flushing operations, and a residue of salty solution or precipitated salt usually remains in the salt tank for comparative long periods of time. The result is that the salt tank usually rusts out and must be replaced at comparatively short intervals.

An important object of the present invention is to provide a water treating plant, so arranged that the saline flushing solution may be produced in an auxiliary tank, and may be fed to the treating tank at will, but in which the salt tank also forms a part of the fresh water flow system between the times of flushing operation.

Excessive rusting of the auxiliary tank and its allied plumbing is therefore eliminated.

Another object is to provide a device which is simple to install, control, and to operate.

Other objects will be apparent from the following description when taken in conjunction with the accompanying two sheets of drawings, wherein.

Like characters of reference designate like parts in all of the figures wherein they occur.

In the drawings.

Figure 1:
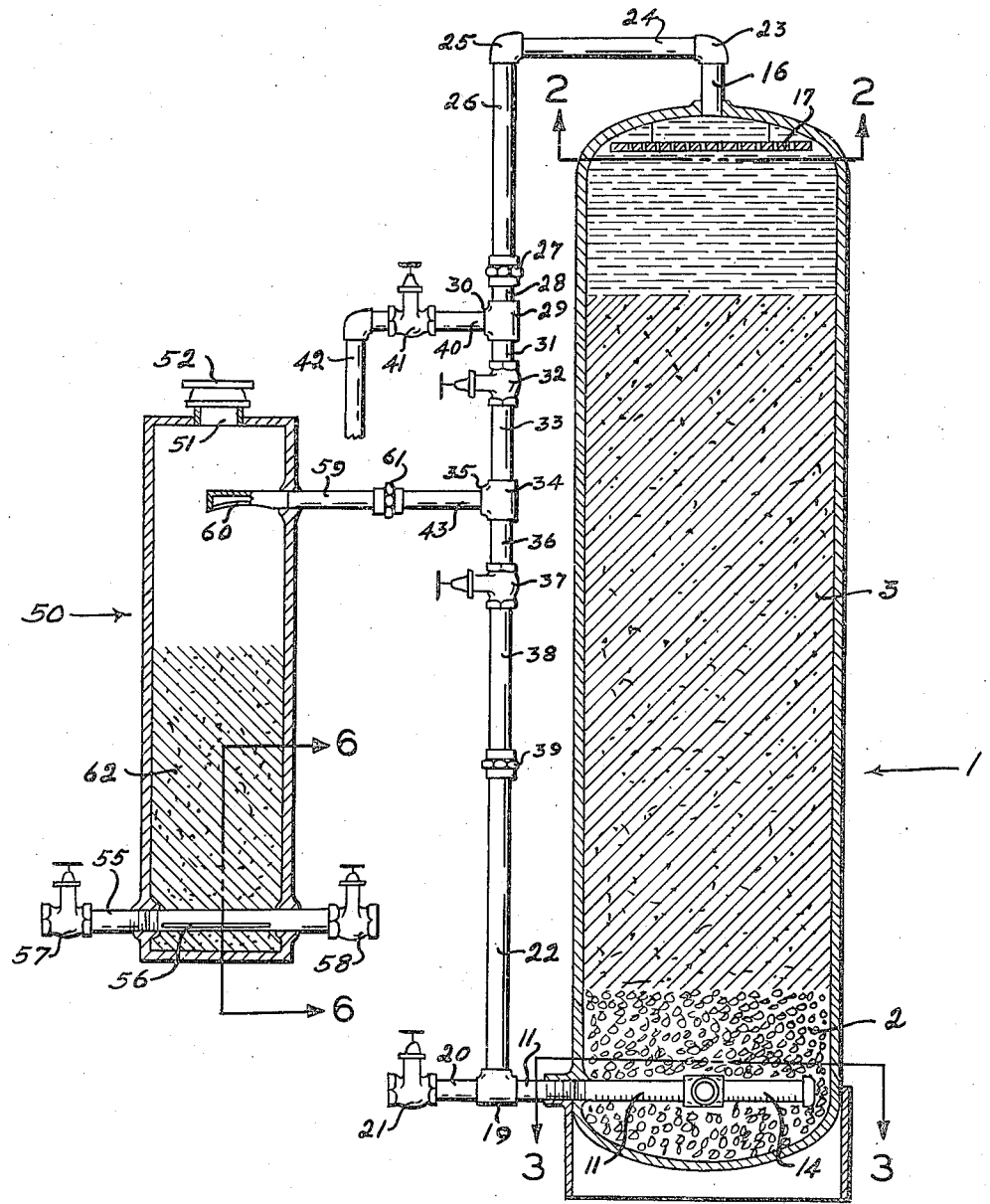
Figure 1 is an elevational view of the treating plant of the present invention, the two tanks being shown in vertical section.

The reference numeral 1 indicates, as a whole, a conventional water treating or filter tank, the lower portion of which is filled with a bed or body 2 of pea-sized gravel, and which contains thereabove, a bed or body 3 of suitable flaked or granulated chemical for treating water as it percolates downwardly therethrough, before it is conveyed to a boiler or other apparatus, not shown.

Figure 3:
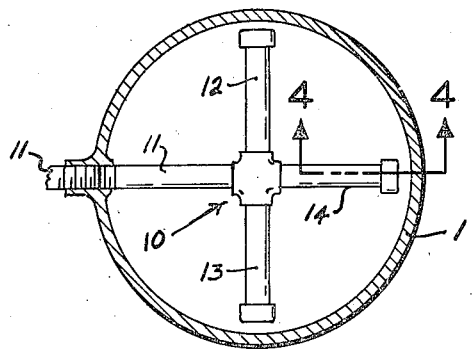
Figure 3 is a horizontal sectional view taken substantially along the line 3—3 of Fig. 1.
Figure 4:
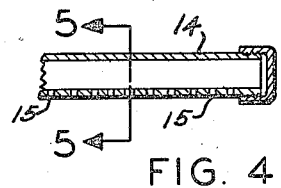
Figure 4 is a fragmentary vertical sectional view taken substantially along the line 4—4 of Fig. 3.
Figure 5:
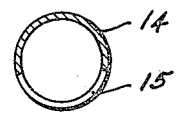
Figure 5 is a sectional view taken substantially along the line 5—5 of Fig. 4.
Figure 6:
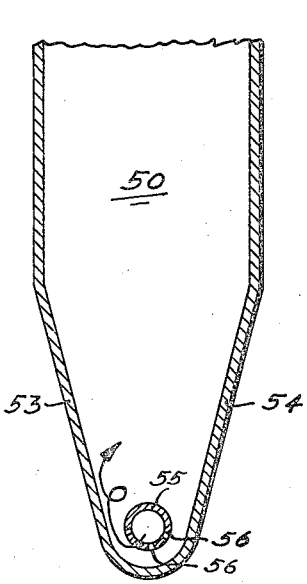
Figure 6 is a vertical sectional view taken substantially along the line 6—6 of Fig. 1.

In carrying out the invention, the following described mechanism is provided:

Horizontally disposed in the lower portion of the tank 1, and imbedded in the gravel body 2, is a cross 10 made of pipe. One leg 11 of the pipe-cross 10 passes hermetically through a side wall of the tank 1, and the other legs 12, 13 and 14 are capped at their outer ends, (Fig. 3). The legs 12, 13 and 14 are substantially identical, and each has a plurality of spaced transverse through slots 15 in its lower wall, (Figs. 4 and 5). The leg 11 also has some of the slots 15.

Figure 2:
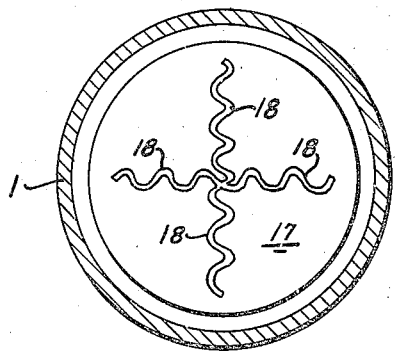
Figure 2 is a horizontal sectional view taken substantially along the line 2—2 of Fig. 1.

The upper end of the tank 1 is closed except for a through perforation which threadedly receives a pipe nipple 16. Within the tank 1 and spacedly disposed a slight distance below the lower end of the nipple 16, there is provided a rigidly mounted horizontal baffle plate or disc 17 which has two waved through slots 18, (Fig. 2).

Outside of the tank 1, the leg 11 of the pipe-cross 10 is equipped with a pipe-T 19, the horizontal leg of which receives a horizontal nipple 20 adapted to be selectively closed by a suitable valve 21. The vertical leg of the pipe-T 19 receives a vertically disposed pipe section 22.

The nipple 16 in the upper end of the tank 1 is connected by an elbow 23 to a horizontal pipe section 24, which in turn is connected by another elbow 25 to a vertically disposed depending pipe section 26. The pipe sections 22 and 26 are disposed in vertical axial alignment with each other.

Between the adjacent ends of the two pipe sections 22 and 26, the following elements are disposed, beginning at the top: a pipe union 27; a nipple 28; a pipe-T 29 having a horizontal leg 30; a nipple 31; a cut-off valve 32; a nipple 33; a pipe-T 34 having a horizontal leg 35; a nipple 36; a cut-off valve 37; a nipple 38; and a pipe union 39 connecting the nipple 38 to the lower pipe section 22.

The horizontal leg 30 of the pipe-T 29 receives one end of a nipple 40 to the other end of which is connected a cut-off valve 41, and the outer end of the valve 41 is connected to a flushing water exhaust line 42.

The horizontal leg 35 of the pipe-T 34 has a nipple 43 connected thereto.

The reference numeral 50 indicates, as a whole, an auxiliary or salt tank, having an upper opening 51 adapted to be hermetically closed by a suitable cap 52.

The salt tank 50 is preferably cylindrical in general shape, and its lower end is preferably formed by two converging side walls 53 and 54. A horizontally disposed pipe 55 passes through the tank 50 between the converging walls 53 and 54, and the pipe 55 has a plurality of elongated through slots, 56 one of which may be seen in Fig. 1. The pipe 55 is hermetically sealed with the tank walls through which is passes, and the protruding ends thereof are equipped with cut-off valves 57 and 58.

Adjacent its upper end, the tank 50 is provided with a horizontal outlet pipe 59, the inner end of which has an arcuate cut-away portion 60 to admit liquid thereinto. The outlet pipe 59 projects hermetically through the wall of the tank 50, and its outer end is connected by a pipe-union 61 to the above described horizontal nipple 43.

During normal operation of the above described treating apparatus, the valves 58, 37, and 41 are closed. A water supply line, not shown, is connected to the valve 57 which is normally open. Untreated water flows into the salt tank 50 through the slots 56 in the pipe 55, and out of the tank through the pipe 59. The water reaches the tank 1 by passing from the pipe 59 through the union 61, the nipple 43, the pipe-T 34, the nipple 33, the open valve 32, the nipple 31, the pipe-T 29, the nipple 28, the union 27, the pipe section 26, the elbow 25, the pipe section 24, the elbow 23, and the nipple 16.

The water in entering the tank 1 encounters the baffle plate 17 and its speed of travel is therefore checked to prevent undue agitation of the bed 3. The water percolates downwardly through the chemical bed and the gravel bed 2, and enters the slots 15 in the legs of the pipe-cross 10. From the pipe-cross, the treated water leaves the tank 1 through the horizontal leg 11 and the valve 21.

The pipe connections between the tank 50 and the tank 1 might well be considered to constitute a pipe Y, with the elements 59, 61 and 43 constituting the central leg, the elements 33, 32, 31, 29, 28, 27, 26, 25, 24, 23, and 16 constituting the upper branch of the Y, and the elements 36, 37, 38, 39, 22, 19, 11, and 10 constituting the lower branch of the Y.

When it becomes desirable to flush the chemical bed 3 with salt water, the valves 57, 32, and 21 are first closed; the valves 37 and 41 are then opened, and the valve 58 is finally opened just long enough to drain the auxiliary tank 50, then it is re-closed. With the salt tank empty, or partially so, the cap 52 is removed and the tank is filled or partially filled with salt, after which the cap is replaced. The salt thus placed in the tank 50 is indicated by the reference numeral 62. The plant is then in condition for the flushing operation to be started by the opening of the valve 57.

When the valve 57 is thus opened, water enters the tank 50 through the slots 56 in the horizontal pipe 55, and forms with the salt body 62 a saline flushing solution. The solution leaves the tank 50 through the outlet pipe 59 and travels to the cross 10 in the tank 1 via the following described course; through the union 61; the nipple 43; the T 34; the nipple 36; the open valve 37; the nipple 38; the union 39; the vertical pipe 22; the T 19; and the leg 11 of the pipe-cross 10. The flushing solution enters the gravel bed 2 through the slots 15 with sufficient force and velocity to suitably agitate and wash the particles composing the chemical bed 3. The used flushing solution then leaves the tank 1 through the nipple 16, and travels to the exhaust or waste pipe 42 through the elbow 23; the pipe section 24; the elbow 25; the vertical pipe section 26; the union 27; the nipple 28; the T 29; the nipple 40; and the open valve 41.

After the flushing operation has been continued for the desired length of time, the system is returned to its normal operative position by opening the valve 32; closing the valves 37 and 41; and by then opening the valve 21.

The treating operation then continues as above described with the incoming un-treated water passing through the salt tank 50 before reaching the treating tank 1 through the nipple 16.

From the foregoing description it is thought to be apparent, that a water treating plant or system has been disclosed which will accomplish the objects and purposes set forth.

Obviously the invention could well be altered to some extent without defeating its practicability, and I therefore do not wish to be confined to only the preferred embodiment shown in the drawings and described hereinabove, further than I am limited by the scope of the appended claim.

I claim:

The combination with a water treating tank containing a chemical bed through which water may flow through an outlet toward a point of consumption, said tank having a disposal outlet for waste fluid, of: an auxiliary salt tank having an inlet for raw water; a pipe Y having its center leg attached to the salt tank and acting as an outlet therefor, one branch of the Y being connected to the upper portion of said treating tank, and the other branch being attached to the lower portion of said treating tank; valves arranged in said Y whereby raw water may be delivered from the salt tank to the upper end of said treating plant, and also whereby water may be delivered from the salt tank to the lower portion of the treating plant when it is desired to salt-wash the chemical bed therein.

JOHN C. KING.

REFERENCES CITED

The following references are of record in the file of this patent:

UNITED STATES PATENTS

| Number | Name | Date |
|---|---|---|
| 1,620,717 | Brice | Mar. 15, 1927 |
| 1,703,451 | McGill | Feb. 26, 1929 |
| 1,775,412 | Tannehill | Sept. 9, 1930 |
| 1,867,572 | Johnson | July 19, 1932 |
| 2,077,003 | Nash | Apr. 13, 1937 |
| 2,347,201 | Lindsay | Apr. 25, 1944 |